US 6,747,764 B1

(12) United States Patent
Chu

(10) Patent No.: US 6,747,764 B1
(45) Date of Patent: Jun. 8, 2004

(54) HIGH SPEED SCANNER

(75) Inventor: Ying-Ping Chu, Tainan (TW)

(73) Assignee: Winbond Electronics Corp. (TW)

( * ) Notice: Subject to any disclaimer, the term of this patent is extended or adjusted under 35 U.S.C. 154(b) by 516 days.

(21) Appl. No.: 09/717,619

(22) Filed: Nov. 21, 2000

(51) Int. Cl.⁷ .............................................. H04N 1/04
(52) U.S. Cl. ...................................... 358/474; 358/505
(58) Field of Search .......................... 358/474, 505, 358/513, 530, 473, 482

(56) References Cited

U.S. PATENT DOCUMENTS 6,204,494 B1 * 3/2001 Chavez .................. 250/208.1
6,233,064 B1 * 5/2001 Griffin ...................... 358/474
6,344,906 B1 * 2/2002 Gatto et al. ................ 358/443

* cited by examiner

*Primary Examiner*—Kimberly Williams
*Assistant Examiner*—Negussie Worku
(74) *Attorney, Agent, or Firm*—Raymond Sun

(57) ABSTRACT

A scanner has a housing, and a glass piece positioned over the housing and covering portions of the interior of the housing, with the glass piece adapted to support an image to be scanned. The scanner further includes a sensor positioned inside the housing below the glass piece, and a light source positioned inside the housing below the glass piece in a manner to direct a light beam at the glass piece so that the light beam is reflected off the glass piece and is received by the sensor to capture the image to be scanned. As a result, the entire image is captured at the same time by the sensor.

19 Claims, 2 Drawing Sheets

HIGH SPEED SCANNER

BACKGROUND OF THE INVENTION

1. Field of the Invention

The present invention relates generally to scanners, and more particularly, to a high speed scanner that operates in a manner similar to a conventional digital camera for capturing the image of a document that is to be scanned.

2. Background Art

As used herein, the term "image" shall mean the image or text on a document that is to be scanned by a scanner.

Conventional scanners are provided with line sensors that are driven by a motor to scan the image one line at a time. There are several disadvantages that are experienced by such conventional scanners. First, the motor generates undesirable noise.

Second, the scanning speed is slow is because the image needs to be scanned one line at a time. For higher resolution scanners, the scanning speed may be even slower since each image will have more lines to be scanned.

Third, most conventional scanners communicate with the personal computer (PC) via the printer port or USB 1.1. This communication speed is also very slow (about 6 Mb/sec.), so that even increasing the scanning speed will not help significantly in increasing the overall speed of scanning and processing an image.

Fourth, the cost of the conventional scanner is very high because many of its components are quite costly. For example, the sensor is costly, and the high-speed image processing (often done by digital signal processing (DSP)) can also be expensive to implement.

Thus, there still remains a need for a high-speed and inexpensive scanner that can capture accurate images.

SUMMARY OF THE INVENTION

It is an object of the present invention to provide a scanner that can scan images and process the scanned images at high speeds.

It is another object of the present invention to provide a scanner that does not utilize a motor.

It is yet another object of the present invention to provide a scanner that communicates with a processing or storage device at high speeds.

To accomplish the objectives of the present invention, there is provided a scanner having a housing, a glass piece positioned over the housing and covering portions of the interior of the housing, with the glass piece adapted to support an image to be scanned. The scanner further includes a sensor positioned inside the housing below the glass piece, and a light source positioned inside the housing below the glass piece in a manner to direct a light beam at the glass piece so that the light beam is reflected off the glass piece and is received by the sensor to capture the image to be scanned. As a result, the entire image is captured at the same time by the sensor.

BRIEF DESCRIPTION OF THE DRAWINGS

The invention can be more fully understood by reading the subsequent detailed description of the preferred embodiments, with reference made to the accompanying drawings.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

The present invention provides a scanner that utilizes a CCD/CMOS sensor to capture the image in the same manner as a conventional digital camera would use a CCD/CMOS sensor to capture an image. The CCD/CMOS sensor renders the use of motors completely unnecessary, thereby eliminating the undesirable noise associated with the use of motors. The present invention also utilizes improved links between a corresponding processor or storage device (such as a PC or storage medium) and the scanner that are provided by, for example, IEEE 1394 (400 Mb/sec), USB 2.0 (480 Mb/sec), to increase the communication speed between the processor/storage device and the scanner.

Figure 1:
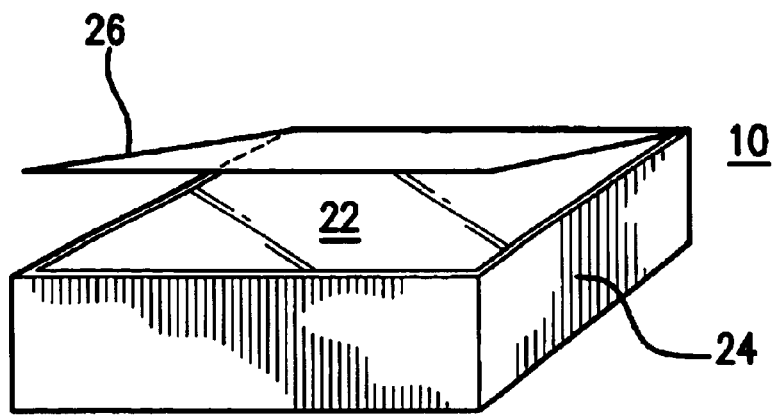
FIG. 1 is a perspective view of a scanner according to one embodiment of the present invention.
Figure 2:
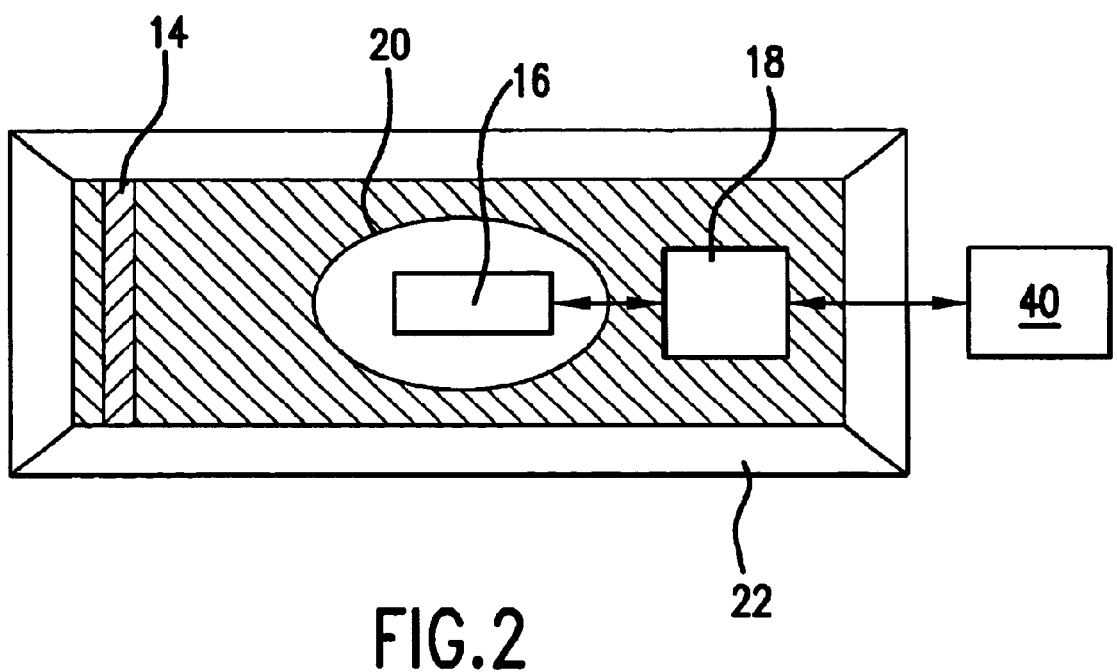
FIG. 2 is a top plan view of the scanner of FIG. 1.
Figure 3:
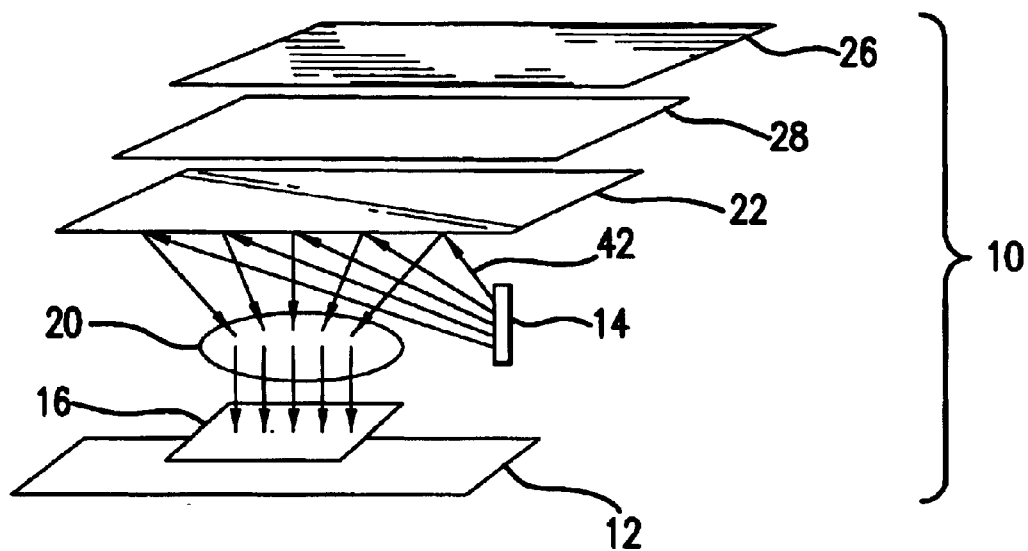
FIG. 3 is an exploded perspective view illustrating some of the components of the scanner of FIG. 1.

FIGS. 1, 2 and 3 illustrate a scanner 10 according to one embodiment of the present invention. The scanner 10 has a housing 24 inside which is housed the components of the scanner 10. The scanner 10 has a printed circuit board (PCB.) 12 affixed to the bottom of the housing 24, and on which is electrically connected a light source 14, a sensor 16 and an ASIC 18. A focus lens 20 is positioned directly (i.e., vertically) above the sensor 16, and a glass piece 22 is positioned above the focus lens 20. The glass 22 functions to cover the PCB 12, the light source 14, the sensor 16, the ASIC 18, the lens 20, and other elements that are housed inside the housing 24.

A cover 26 is pivotally secured to the housing 24, for example in the same manner as for conventional scanners. A document or image 28 is adapted to be placed on the glass 22, so that the cover 26 can be pivoted onto the top of the glass 22, covering the document 28 and securing the document 28 in a fixed position on the glass 22 during the scanning procedure. The cover 26 can be provided in a dark color, and also functions to provide a dark background to further enhance the scanning.

The light source 14 can be a light bulb, a flash light, or any other source that emits light. In one embodiment of the present invention, the light produced by the light source 14 is preferably white light. The light source 14 can be positioned on the PCB 12 in an off-center location so that it is adapted to direct light beams at an angle towards the glass 22.

The sensor 16 can be any conventional CCD/CMOS sensor that is currently being used for digital camera. Here, it is important that the sensor 16 not be any of the conventional line sensors that are currently utilized by the conventional scanners.

The focus lens 20 can be any focusing lens that is well-known in the art, and in one embodiment of the present invention, is preferably a camera lens.

Figure 4:
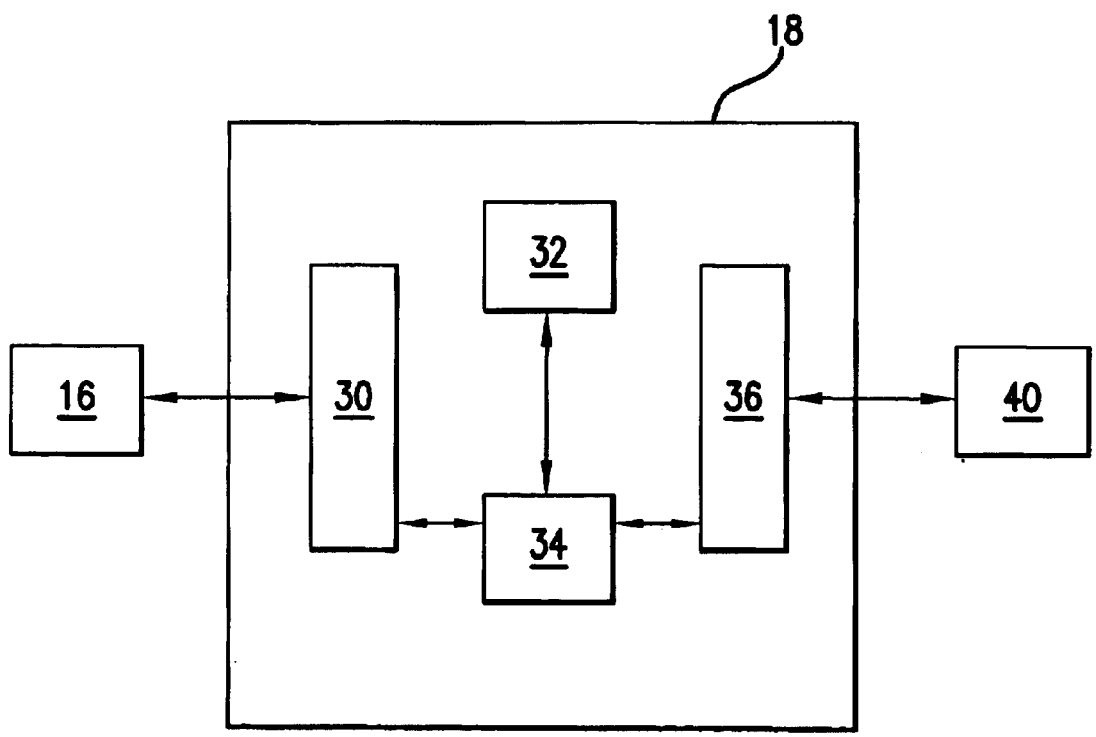
FIG. 4 is a schematic block diagram of the ASIC of FIG. 1.

The ASIC 18 functions to collect the scanned image data from the sensor 16, enlarges the data, filters out unwanted noise, and then provides the image data to a processing or storage device 40. The device 40 can be a personal computer (PC), notebook computer, PDA (personal data assistant), any storage media (e.g., hard disk, floppy disk, flash card), an Internet or network connection, a wireless phone, and a facsimile machine, among others. The ASIC 18 is illustrated in greater detail in connection with FIG. 4. The ASIC 18 has an analog front end (AFE) 30, a buffer memory 32, a control and imagine process (CIP) 34, and an interface logic 36. The AFE 30 processes the signals from the sensor 16, and provides the signals to the CIP 34. For example, the AFE 30 can function to filter out noise and to enlarge the signals from the sensor 16. The CIP 34 generally processes the digital image signal, but can be adapted to perform one or more of many functions, including but not limited to gamma, shading, data or image compression, or any other process to enhance the quality of the captured image. A buffer memory 32 is coupled to the CIP 34 for storing image data captured by the sensor 16. The CIP 34 provides processed image data to the interface logic 36. The interface logic 36 is coupled to the CIP 34 for controlling the communication between the PC 40 and the scanner 10. The communication can be effectuated via USB, IEEE 1394, EPP, printer port, and other known protocols.

The operation of the scanner 10 will now be described. To scan a document, such as 28, the user places the document 28 on the glass 22 and pivots the cover 26 to cover the document 28. The light source 14 then emits rays or beams 42 of light towards the glass 22 and the document 28. These beams 42 are reflected off the glass 22 towards the sensor 16, as shown in FIG. 3. The sensor 16 receives all the light beams at the same time, as if the sensor 16 were receiving a complete image. The light beams 42 received by the sensor 16 represent the image data, and the sensor 16 provides the image data to the ASIC 18 for processing in the manner described above in connection with FIG. 4. The ASIC 18 then provides the processed image data to the device 40, where additional processing can be performed. The processing that can be performed at the device 40 can be the same type of processing that is performed by PCs that are connected to conventional scanners, and can include enlargement, increasing sharpness of the image, adjusting brightness, etc.

In addition, the light source 14 need not have to emit a strong beam of light. Unlike conventional cameras which operate most effectively when given a very short exposure to light (because the photographed object(s) are subject to movement), the scanner 10 does not have the same problem because the document 28 has been placed on the glass 22 and will not move. As a result, even a weak light source 14 can be used effectively in the scanner 10 because the weak light beams 42 can be emitted for a longer period of time since the document 28 is not expected to move. The flexibility to use any desired light source 14 allows for the scanner 10 to be more cost-effecient than conventional scanners and digital cameras.

Thus, the present invention utilizes the principle of photographing the entire document or image 28 at one instance in time. The use of a CCD/CMOS sensor 16 allows the entire image 28 to be captured at the same time, thereby eliminating the need to scan the image one line at a time. With the advancements in semiconductor technology resulting in the cost of CCD/CMOS sensors becoming increasingly less expensive, the present invention is able to provide a high-speed yet accurate scanner that does not generate unwanted noise.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A scanner having a housing, the scanner comprising:
   a glass piece positioned over the housing and covering portions of the interior of the housing, the glass piece adapted to support a stationary image to be scanned;
   a stationary sensor positioned inside the housing below the glass piece; and
   a light source positioned inside the housing below the glass piece in a manner to direct a light beam at the glass piece so that the light beam is reflected off the glass piece and is received by the sensor to capture the image to be scanned.

2. The scanner of claim 1, further including a processor coupled to the sensor for receiving and processing data signals received from the sensor.

3. The scanner of claim 2, wherein the processor includes an analog front end coupled to the sensor for receiving the data signals, a control and imagine processor coupled to the analog front end, and an interface logic coupled to the control and imagine processor and an external device.

4. The scanner of claim 3, wherein the processor further includes a memory coupled to the control and imagine processor.

5. The scanner of claim 1, further including a pivoting cover secured to the housing and adapted to cover the glass piece.

6. The scanner of claim 1, further including a link for coupling the sensor to an external device to provide data signals thereto.

7. The scanner of claim 6, wherein the link is selected from one of an IEEE 1394 link, a USB link, a printer port link and an EPP link.

8. The scanner of claim 1, wherein the sensor captures the entire image at the same time.

9. The scanner of claim 1, wherein the sensor is selected from the group consisting of a CCD sensor and a CMOS sensor.

10. A scanner having a housing, the scanner comprising:
    a glass piece positioned over the housing and covering portions of the interior of the housing, the glass piece adapted to support a stationary image to be scanned;
    a stationary CCD or CMOS sensor positioned inside the housing below the glass piece; and
    a light source positioned inside the housing below the glass piece in a manner to direct a light beam at the glass piece so that the light beam is reflected off the glass piece and is received by the sensor to capture the image to be scanned.

11. The scanner of claim 10, further including a processor coupled to the sensor for receiving and processing data signals received from the sensor.

12. The scanner of claim 11, wherein the processor includes an analog front end coupled to the sensor for receiving the data signals, a control and imagine processor coupled to the analog front end, and an interface logic coupled to the control and imagine processor and an external device.

13. The scanner of claim 12, wherein the processor further includes a memory coupled to the control and imagine processor.

14. The scanner of claim 10, further including a link for coupling the sensor to an external device to provide data signals thereto.

15. The scanner of claim 14, wherein the link is selected from one of an IEEE 1394 link, a USB link, a printer port link and an EPP link.

16. The scanner of claim 10, further including a pivoting cover secured to the housing and adapted to cover the glass piece.

17. The scanner of claim 10, wherein the sensor captures the entire image at the same time.

18. A method of scanning an image on a stationary document, comprising the steps of:
   a. providing a scanner having:
      a glass piece adapted to support an image to be scanned;
      a stationary CCD or CMOS sensor positioned below the glass piece; and
      a light source positioned below the glass piece;
   b. directing a light beam from the light source at the glass piece so that the light beam is reflected off the glass piece and is received by the CCD or CMOS sensor; and
   c. capturing the entire image at the same time at the CCD or CMOS sensor.

19. The method of claim 18, further including:
   d. processing signals received from the CCD or CMOS sensor; and
   e. furnishing the processed signals to an external device.

* * * * *